Figure 1:
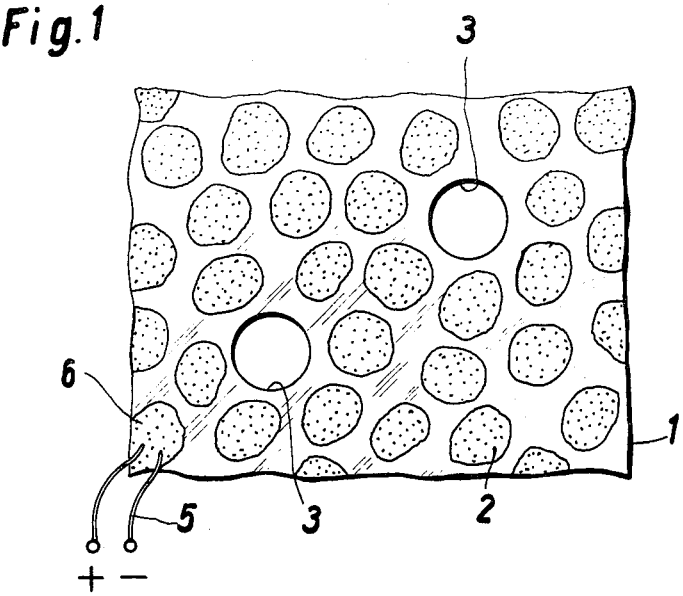

United States Patent
Weman

[11] 3,776,570
[45] Dec. 4, 1973

[54] AIR BAG FOR MOTOR VEHICLES FOR THE PREVENTION OF INJURIES IN COLLISIONS

[75] Inventor: Per Olof Weman, Stockholm, Sweden

[73] Assignee: Klippah GmbH, Hamburg, Germany

[22] Filed: June 11, 1971

[21] Appl. No.: 152,130

[30] Foreign Application Priority Data
June 16, 1970 Germany.................. P 20 29 587.8

[52] U.S. Cl. ............... 280/150 AB, 102/39, 244/31
[51] Int. Cl. ............................................. B60r 21/08
[58] Field of Search ............... 23/281; 102/39, 101; 244/31; 280/150 AB

[56] References Cited
UNITED STATES PATENTS

| | | | |
|---|---|---|---|
| 2,974,912 | 3/1961 | Namsick | 244/138 R |
| 3,276,726 | 10/1966 | Webb | 244/31 |
| 3,481,625 | 12/1969 | Chute | 280/150 AB |
| 3,469,805 | 9/1969 | Craig | 244/31 |
| 3,552,770 | 1/1971 | Berryman | 280/150 AB |
| 3,606,377 | 9/1971 | Martin | 280/150 AB |
| 3,624,810 | 11/1971 | Hass | 280/150 AB |
| 3,643,971 | 2/1972 | Kushnick | 280/150 AB |
| 3,549,169 | 12/1970 | Oldberg | 280/150 AB |
| 3,532,360 | 10/1970 | Leising et al. | 280/150 AB |

Primary Examiner—Kenneth H. Betts
Assistant Examiner—John P. Silverstrim
Attorney—Jonathan Plaut

[57] ABSTRACT

An air bag for preventing injuries to the passengers of a motor vehicle having on the inner wall of the bag a coating of a substance adapted to generate a gas to inflate the air bag. The coating may be arranged in discrete sections and be fired by an electric ignition device. Additionally air intake openings may be provided, for sucking in air from the passenger compartment.

5 Claims, 3 Drawing Figures

PATENTED DEC 4 1973    3,776,570

AIR BAG FOR MOTOR VEHICLES FOR THE PREVENTION OF INJURIES IN COLLISIONS

SUMMARY OF THE INVENTION

For preventing the hazard of injuries to the passengers of a motor vehicle if the vehicle collides it is known to provide within the vehicle an air bag that is abruptly inflated if the vehicle is involved in an accident. For the inflation of the air bag is usually employed a gas cartridge which introduces a gas into the air bag. A disadvantage of devices of this type is the high cost involved for making such a device fail-safe.

It is an object of the present invention to provide a novel and improved air bag which does not require any special gas cartridge and no additional devices for opening such a gas cartridge.

In accordance with the present invention the inner wall of the air bag is coated with a substance adapted to generate a gas inflating the air bag, due to a chemical conversion.

With an air bag of this type, the explosible coating needs to be fired in one spot only, to develop a gas for filling the air bag. This filling operation may be induced to occur very quickly by employing a readily inflammable coating such as a coating of black powder or another commercially available highly explosive substance. Moreover, there exists the possibility to control in advance the filling of the air bag and the direction of its development by a suitable distribution of the explosible coating on the inner wall of the air bag. Thus the coating is preferably arranged in discrete sections on the inner wall of the air bag.

The coating may be designed by employing a separate sheet attached to a laminated material, or by providing a foamed material web in the air bag whereby the sheet of the laminated material has been impregnated with a liquid containing the explosible powder.

It has been found to be suitable if the air bag is provided with air intake openings. This entails the advantage that during the development of the air bag air is sucked in from the passenger compartment, and this air further enhances the combustion. Furthermore the pressure wave generated during the development of the air bag is smaller since not so much additional gas for the development of the air bag is pressed into the passenger compartment, as compared for example when employing a gas cartridge.

The ignition of the explosible coating may be provided on principle by chemical action. It is, however, more advantageous to employ electrical ignition since this type of ignition is more reliable and less costly.

Figure 2:
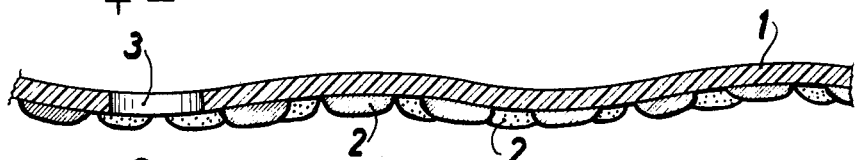

In the following, an exemplary embodiment of the invention will be described with reference to the appended drawing wherein FIG. 1 is a fragmentary top view of an air bag portion;

FIG. 2 is a cross-section through the wall of the air bag; and

Figure 3:
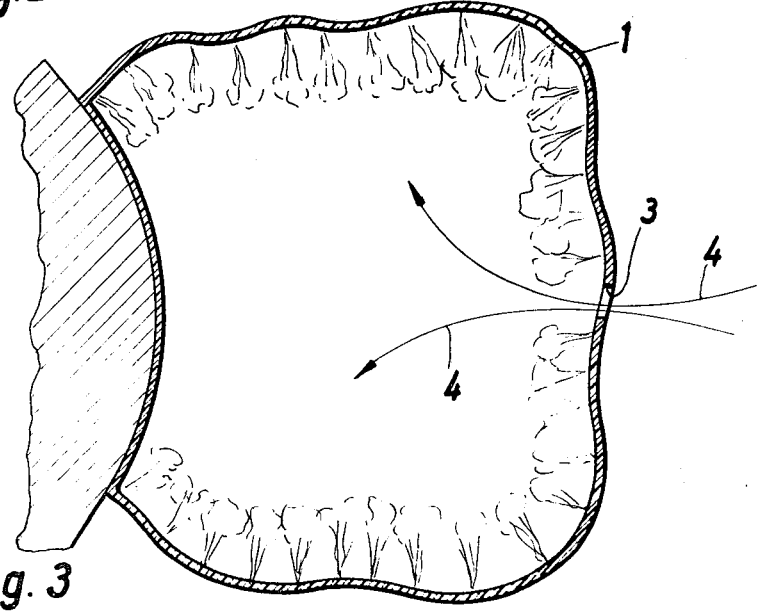

FIG. 3 schematically shows an air bag during its development by explosion.

The air bag shown in the drawing consists of a plastic sheet 1 which is coated on its inner side with a coating 2 consisting of a substance adapted to generate a gas when ignited.

The coating 2 is arranged in discrete sections 6 on the inner wall of the air bag 1. Air intake openings 3 are arranged in the plastic sheet between the discrete coating sections. During the development of the air bag air from the passenger compartment may enter into the air bag according to the arrows 4.

Two electrical leads 5 are provided for igniting the explosible gas generating coating 2. These leads 5 are connected to an electric switch not shown in the drawing which produces a short circuit when the vehicle decceleration exceeds a predetermined threshold value and fires the discrete section 6 of the coating 2. An ignition or respectively explosion of the coating in the discrete section 6 induces, by reaction, successively also the explosion of the laminated material in the other sections. Thus the explosion advances along the interior wall of the air bag so that due to the pressure of explosion the air bag will be urged outwardly in all directions and will be unfolded to its full size, by simultaneously drawing in air through the intake openings 3.

What is claimed is:

1. An air bag for motor vehicles for the prevention of injuries to passengers in collisions, said air bag comprising a plastic sheet provided with an inner wall having an explosible coating in communication therewith adapted to generate a gas to inflate said air bag, said explosible coating being distributed over a substantial portion of said inner wall.

2. An air bag as recited in claim 1 wherein the coating is arranged in discrete sections on the inner wall of the air bag.

3. An air bag as recited in claim 2 wherein the air bag is provided with an electrical ignition device for igniting the coating.

4. An air bag as recited in claim 2 wherein the air bag is provided with air intake openings.

5. An air bag as recited in claim 4 wherein said coating is black powder.

* * * * *